Figure 1:
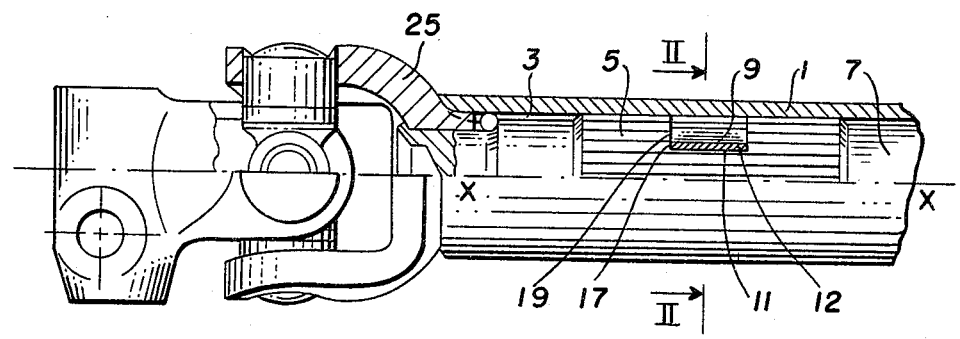

United States Patent [19]

Mallet

[11] 4,406,641
[45] Sep. 27, 1983

[54] TORQUE TRANSMITTING COUPLING

[75] Inventor: Bernard Mallet, Limay, France

[73] Assignee: Nadella, France

[21] Appl. No.: 193,309

[22] Filed: Oct. 2, 1980

[30] Foreign Application Priority Data

Oct. 22, 1979 [FR] France ............................. 79 26125

[51] Int. Cl.³ .............................................. F16D 3/06
[52] U.S. Cl. .................................... 464/162; 464/180;
74/492
[58] Field of Search .................... 403/359; 464/74, 82,
464/84, 158, 162, 179, 180, 181; 74/492

[56] References Cited

U.S. PATENT DOCUMENTS

| | | | |
|---|---|---|---|
| 3,367,142 | 2/1968 | Groves et al. | .......................... 64/23 |
| 3,369,425 | 2/1968 | Runkle et al. | ...................... 64/23 X |
| 4,269,043 | 5/1981 | Kizu et al. | ........................... 64/23 X |

FOREIGN PATENT DOCUMENTS

| | | | |
|---|---|---|---|
| 938679 | 10/1963 | United Kingdom | ................. 464/82 |
| 1140944 | 1/1969 | United Kingdom . | |
| 657192 | 4/1979 | U.S.S.R. | ................................ 464/82 |

Primary Examiner—Stuart S. Levy
Assistant Examiner—Daniel P. Stodola
Attorney, Agent, or Firm—Robert E. Burns; Emmanuel J. Lobato; Bruce L. Adams

[57] ABSTRACT

The coupling comprises a tubular sleeve (1) having internal splines (3) and a shaft (7) with complementary splines which are fitted in and engaged with the splines (3) so that the shaft and sleeve are relatively axially slidable. In order to reduce angular play between the splines of the sleeve and the shaft, a spring in the form of a plate (9, 9') is elastically jammed between a transverse recess (11) formed in the shaft and the inner surface of the sleeve. The spring plate bears against the recess by a center portion of the plate and against the inner surface of the sleeve by its ends (13) which engage the flanks (15) of two of the splines (3) of the sleeve.

5 Claims, 3 Drawing Figures

TORQUE TRANSMITTING COUPLING

The present invention relates to a coupling having means to act to reduce angular play within the coupling and particularly relates to such a coupling wherein the axial length is variable.

Known forms of such coupling have especial application in vehicle steering columns and comprise a shaft of generally rectangular or polygonal cross-section rotatively connected, with the interposition of elastic means, to a hub of complementary internal cross-section.

The object of the present invention is to provide a coupling of the kind wherein the rotational connection is by means of complementary axial splines and of a design that possesses the advantages of greater simplicity of manufacture and assembly, of pre-stressing the elastic means and of variable axial length in normal operation and/or is axially collapsible under the action of an axial impact of pre-determined intensity.

Accordingly the present invention provides a coupling of which one part is a tubular sleeve having internal axial splines and another part is a shaft or other torque-transmitting member having co-operating complementary splines that is fitted in and axially slideable with respect to the sleeve with the interposition of at least one elastic compression spring, characterised in that the spring is compressed against and fast with a transversely recessed portion on one part and is capable of sliding axially against the other part.

In a preferred embodiment of the invention, the recessed portion is formed in the body of the shaft or torque-transmitting member and the spring is generally disposed against the recessed portion whilst ends of the spring bear slidingly against the sleeve splines.

Figure 2:
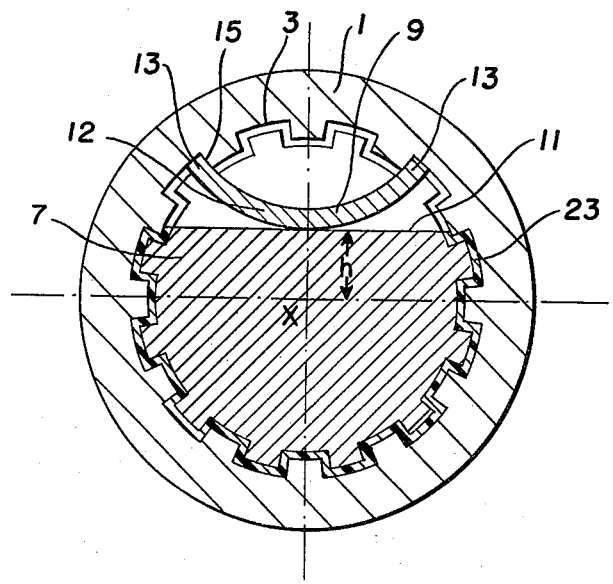
Figure 3:
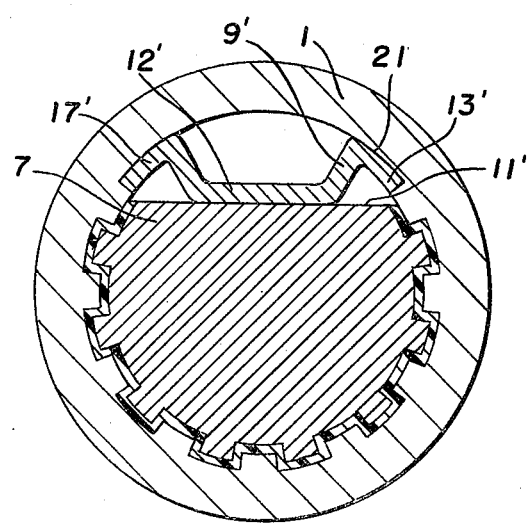

The invention is illustrated, by way of example, in the Drawings, wherein:

FIG. 1 is an axial section of one embodiment of a coupling in accordance with the invention, FIG. 2 is a transverse section on the line II—II of FIG. 1, and FIG. 3 is a similar transverse section of another embodiment of the invention.

As shown by FIG. 1, a coupling for a sliding column consists of a tubular sleeve 1 having internal axial splines 3 which co-operate with comlementary splines on at least part of a torque-transmitting member 7, such as a shaft, that is fitted within and capable of moving axially with respect to the sleeve to form a coupling of variable axial length.

The coupling is provided with an elastic element 9 to act to reduce angular play between the sleeve part 1 and the shaft part 7. The elastic element 9 is a spring in the form of a flat or slightly curved plate, of a generally rectangular shape form, which is laid transversely of the coupling axis X—X and held in elastic compression between a recessed portion 11, such as a flat formed locally on the shaft 7, and the inside of the sleeve 1. The spring 9 bears by its slightly convex, central portion 12 against the flat 11 and by its ends 13 against the flanks 15 of two of the sleeve splines 3.

It is clear that this arrangement, of exploiting the splines, produces a simple coupling. The spring 9 being rendered fast with the shaft 7 by the axial abutment of its sides 17 against the transverse walls 19 of the recessed shaft portion 11. Also, the spring ends 13 can slide axially along the whole length of the sleeve spines producing a variable length coupling, for normal operation and/or impact collapse.

The amount of pre-stress compression given to the spring 7 may simply be set; either by the selection of the configuration of the spring's central portion i.e. generally flat, convex or concave; or by the "depth" of the shaft flat 11, i.e. the radial distance "h" of the flat from the shaft axis X—X.

An alternative embodiment of the invention is shown by FIG. 3, wherein a spring 9' in the form of a plate is under compression and has a flat, or slightly domed, central portion 12' in contact with a flat 11', or the like, formed on the shaft. The outward spring end portions 13' bear against a splineless, transversely recessed portion 21 in the sleeve. The spring 9' being rendered fast with the sleeve by the axial abutment of its sides 17' against the transverse walls of the recessed sleeve portion 21. Also, the spring's central portion 12' can slide axially along the length of the shaft flat 11'; the flat length thereby setting the amount of variation in the length of the coupling.

The axial sliding movement of the shaft within the sleeve can be improved, in the known manner, by a plastics covering 23 on the shaft.

The coupling described is shown to be part of a universal joint 25 in which the fork arms are either attached to or formed, by cutting and shaping, in the end of the sleeve remote from the end receiving the shaft.

In an unillustrated alternative, the universal joint fork arms are replaced by a securing flange.

A coupling in accordance with the invention is not to be limited to the provision of one spring plate. For example, two spring plates with an axial offset and fitted in accordance with one or the other of the above described embodiments may be used.

I claim:

1. A coupling comprising a first element in the form of a tubular sleeve having inner axial splines, a second element in the form of a shaft or other torque transmitting member which has outer axial splines complementary to and cooperative with the splines of the sleeve and is slidably mounted in the sleeve, a radially recessed portion on one side of one said elements, and a spring plate which is disposed in said recessed portion and elastically jammed between the recessed portion and a confronting portion of the other of said elements by engagement of a centre portion of the plate with said recessed portion and engagement of two opposed axially extending edge portions of the plate with said other element wherein the spring plate has a substantially convex side facing said recessed portion, thereby to bias the shaft radially against the sleeve and take up play between said splines.

2. A coupling according to claim 1, wherein said recessed portion is an intermediate portion of said one element and is defined by two axially spaced apart shoulders which cooperate with opposed axial ends of said plate for axially retaining said plate relative to said one element, the splines of said one element extending axially on both sides of said recessed portion.

3. A coupling according to claim 1 or 2, wherein said recessed portion is provided on said second element and said edge portions of the plate slidably bear against splines of the first element.

4. A coupling according to claim 1, wherein said centre portion of the spring slidably bears against said second element.

5. A coupling according to claim 1 or 2, comprising a universal joint fork at one end of one of said elements.

* * * * *